(12) United States Patent
Stapf

(10) Patent No.: US 7,197,741 B1
(45) Date of Patent: Mar. 27, 2007

(54) INTERFACE FOR AN ENTERPRISE RESOURCE PLANNING PROGRAM

(75) Inventor: Michael D. Stapf, Prior Lake, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 1209 days.

(21) Appl. No.: 09/291,535

(22) Filed: Apr. 14, 1999

(51) Int. Cl.
G06F 9/44 (2006.01)
G06F 13/00 (2006.01)
G06F 9/45 (2006.01)
G06F 3/00 (2006.01)
G06F 9/46 (2006.01)

(52) U.S. Cl. ...................... 717/113; 717/120; 717/136; 717/102; 719/310; 719/313; 719/320; 719/328

(58) Field of Classification Search .................. 717/11, 717/9, 102; 709/203, 205, 300, 224, 104, 709/328; 707/3, 102, 203, 630; 740/270; 395/594, 661, 744, 746, 630
See application file for complete search history.

(56) References Cited

U.S. PATENT DOCUMENTS

| | | | | | |
|---|---|---|---|---|---|
| 5,084,815 | A | * | 1/1992 | Mazzario | 707/7 |
| 5,805,897 | A | * | 9/1998 | Glowny | 395/712 |
| 5,844,554 | A | * | 12/1998 | Geller et al. | 354/333 |
| 5,913,061 | A | * | 6/1999 | Gupta et al. | 709/300 |
| 5,995,945 | A | * | 11/1999 | Notani et al. | 705/28 |
| 6,108,662 | A | * | 8/2000 | Hoskins et al. | 707/102 |
| 6,119,149 | A | * | 9/2000 | Notani | 709/205 |
| 6,157,864 | A | * | 12/2000 | Schwenke et al. | 700/79 |
| 6,167,395 | A | * | 12/2000 | Beck et al. | 707/3 |
| 6,167,406 | A | * | 12/2000 | Hoskins et al. | 707/102 |
| 6,170,011 | B1 | * | 1/2001 | Macleod Beck et al. | 709/224 |
| 6,192,370 | B1 | * | 2/2001 | Primsch | 707/103 |
| 6,199,099 | B1 | * | 3/2001 | Gershman et al. | 709/203 |
| 6,256,676 | B1 | * | 7/2001 | Taylor et al. | 709/246 |
| 6,268,853 | B1 | * | 7/2001 | Hoskins | 700/83 |
| 6,289,382 | B1 | * | 9/2001 | Bowman-Amuah | 709/226 |

OTHER PUBLICATIONS

Baum, D., "Please pass the data," *Manufacturing Systems*, 16(9), pp. 104-108 (Sep. 1998).
Donahoo, M. J., et al., "From Data to Knowledge: Method-Specific Transformations," *Proc. of the 10th Int. Symposium on Foundations of Intelligent Systems*, Oct. 15-18, 1997, pp. 411-420.

* cited by examiner

*Primary Examiner*—Hoang-Vu Antony Nguyen-Ba
(74) *Attorney, Agent, or Firm*—Fogg & Associates, LLC; Scott V. Lundberg

(57) ABSTRACT

A method for interfacing with an enterprise resource planning system is provided. The method includes providing a file containing data to be loaded into the enterprise planning system (the "data file"). A file containing at least one parameter (the "parameter file") is created. The parameter file maps data from the data file to screens of the enterprise resource planning system. Each record in the data file is processed according to the parameters in the parameter file to execute screens of the enterprise resource planning system so as to provide the data from the data file to the enterprise resource planning system.

26 Claims, 8 Drawing Sheets

INTERFACE FOR AN ENTERPRISE RESOURCE PLANNING PROGRAM

TECHNICAL FIELD OF THE INVENTION

The present invention relates generally to the field of computer software and, in particular, to an interface for an enterprise resource planning program.

BACKGROUND

With the explosion of information available today, it has become critical for organizations to carefully manage their information to meet organizational objectives. Enterprise Resource Planning (ERP) systems are integrated information systems that have been developed to serve a variety of departments within an enterprise, e.g., corporation, to make effective use of its information. ERP systems evolved out of the manufacturing industry. Generally, ERP systems use packaged software rather than proprietary software written by or for one customer. ERP modules may be able to interface with an organization's own software with varying degrees of effort, and, depending on the vendor, ERP software may be alterable via programming.

ERP systems typically include software that manages information for use in manufacturing, order entry, accounts receivable and payable, general ledger, purchasing, warehousing, transportation and human resources. ERP systems are commercially available from companies such as SAP, PeopleSoft™, Oracle™, Baan™, J.D. Edwards™, and others.

One problem with ERP systems is loading or interfacing the ERP systems with data from existing systems, so-called "legacy data." For purposes of this specification, the terms "loading" and "interfacing" are used interchangeably to refer to providing data from a non-ERP system or data source to an ERP system. Conventionally, legacy data is provided to the ERP system through a custom-built interface. Taking SAP's R/3 ERP system as an example, the following steps are typically used to provide legacy data to the ERP system:

1. Determine the on-line transaction needed to load/update/delete the data in the ERP system.
2. Manually execute the screens for the transaction, writing down each screen and field name that is populated, as well as what buttons are pushed to navigate through the screens.
3. Design a fixed-format file layout for the legacy data.
4. Write a program to extract the legacy data from the legacy system using the file layout to format the data.
5. Write an SAP Batch Data Conversion (BDC) program to read data from the file extracted from the legacy system, and, using the data collected in (2) above, write a program in "ABAP" code—a specialized language for SAP's ERP system—to execute each screen, populate each field, and execute the navigation in the correct sequence.
6. Create test data using the file layout from (3) above.
7. Test the SAP BDC program to make sure it works properly, and that all fields and screens contain the correct data.
8. Execute the program generated in (4) above.
9. Redo (7) using the data from (8).
10. Once all debugging is complete, use SAP "transports" to move the SAP BDC program into a production mode.
11. Execute the SAP BDC program against the live production of the SAP system.

This process is time consuming and requires the expertise of a number of different people. For example, an SAP business analyst or end user gathers the information on the particular screens needed to get the data into the ERP system and to execute the final SAP BDC program. A programmer familiar with SAP BDC and ABAP programming language creates and tests the SAP BDC program. A programmer or analyst familiar with a programming language such as COBOL or C++ creates code to extract the data from the legacy system. Finally, an SAP BASIS transport specialist moves the SAP BDC program into production mode. At each point in this process, misunderstanding between each of these individuals could cause severe problems in providing the data to the ERP system. Further, this process must be worked through completely to create a custom interface for each set of data to be provided to the ERP system.

For the reasons stated above, and for other reasons stated below which will become apparent to those skilled in the art upon reading and understanding the present specification, there is a need in the art for an improved interface for enterprise resource planning programs.

SUMMARY

The above mentioned problems with interfacing with an enterprise resource planning program and other problems are addressed by the present invention and will be understood by reading and studying the following specification. An interface is described which provides data to an enterprise resource planning program from a data source using a parameter file that maps the enterprise resource planning system with the data source.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

I. OVERVIEW

Figure 1:
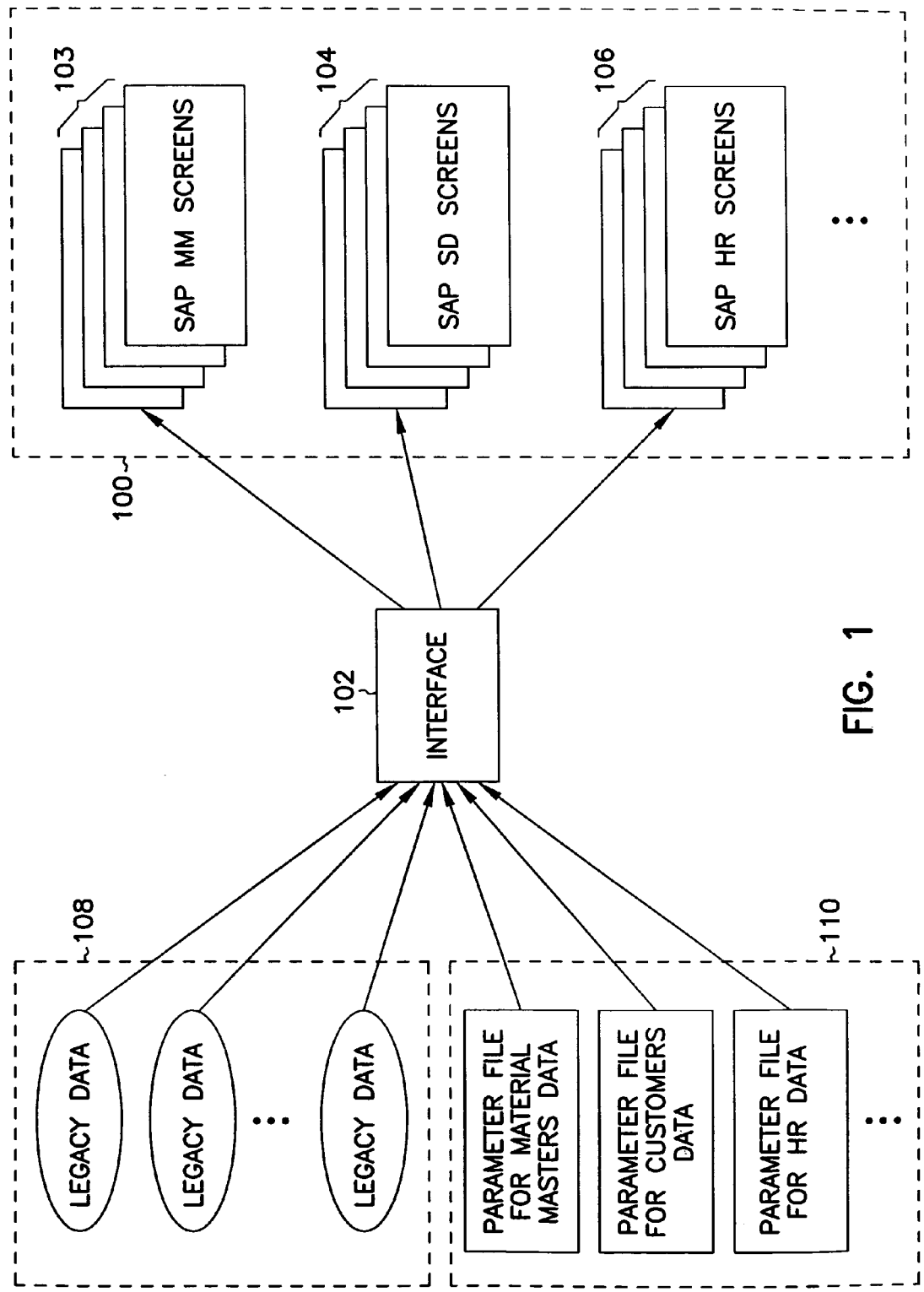
FIG. 1 is a data flow diagram of an illustrative embodiment of a process for an interface for an enterprise resource planning program according to the teachings of the present invention.

FIG. 1 is a data flow diagram of an illustrative embodiment of a process for an interface, indicated generally at 102, for providing data to an enterprise resource planning (ERP) system 100 according to the teachings of the present invention. As described above, ERP system 100 is an integrated information system that serves a variety of departments within an enterprise. ERP system 100 includes software that, for example, manages information for use in manufacturing, order entry, accounts receivable and payable, general ledger, purchasing, warehousing, transportation and human resources. ERP system 100 may comprise an ERP system that is commercially available from SAP, PeopleSoft™, Oracle™, Baan™, J.D. Edwards™, or other vendors. ERP system 100 is described in terms of the SAP's R/3 ERP system although it is understood that interface 102 can be adapted for use with other ERP systems.

ERP system 100 has an interface for receiving data input. In the embodiment of FIG. 1, the interface is a graphical user interface (GUI) that is represented by three groups of screens. ERP system 100 includes screens for loading data for material masters 103, customers 104, and human resources 106. Each group of screens is used to enter data into associated fields for different transactions for ERP system 100. It is understood that these screens are shown by way of example and not by way of limitation. The screens provided in ERP system 100 can be varied as necessary for the specific needs of an enterprise.

Interface 102 provides data from data files 108 to ERP system 100 using one or more associated parameter files 110. Advantageously, interface 102 provides a standard interface for all of the transactions for ERP system 100. Parameter files 110 provide interface 102 with the unique information necessary to provide data to ERP system 100 for a particular transaction. Thus, to provide data to ERP system 100 for a particular transaction, a user need only create an appropriate parameter file that maps data in data file 108 with the appropriate screens and fields of ERP system 100. Interface 102 then uses the parameter file to load the data into the correct fields of the ERP system. Since the parameter file is simply a map between the data file and the ERP system, it can be created using any acceptable text editor and does not require knowledge of a unique programming language.

Interface 102 can use a number of other files in providing data to ERP system 100. These files are identified in Table 1 below. Some of these files are described in further detail below. The particular files used in processing data for a transaction can be determined by the parameter file.

TABLE 1

| File Name | Ext | Description | I/O |
| --- | --- | --- | --- |
| INFILE | .txt | Data used to fill in screens of ERP system | INPUT |
| ERRFILE | .err | Error messages generated while providing data to ERP system | OUTPUT |
| REJFILE | .rej | Records from INFILE for failed transactions | OUTPUT |
| REJPLUS | .rejplus | Same as REJFILE, but with failure code tacked on to beginning of each record | OUTPUT |
| PARMFILE | .prm | Parameters used to instruct interface how to fill in screens of ERP system | INPUT |
| RCDDESC | .rcd | describes atypical INFILE record format | INPUT |

TABLE 1-continued

| File Name | Ext | Description | I/O |
| --- | --- | --- | --- |
| AUDFILE | .aud | Identifies when each record set was read in and, optionally, if it worked or failed | OUTPUT |
| STOPFILE | .stop | Presence of file causes interface to cease processing data from INFILE | INPUT |
| MAILFILE | .mailout | Similar to ERRFILE but formatted for transmission via e-mail | OUTPUT |
| MAILLIST | .maillist | Lists e-mail addresses to receive MAILFILE | INPUT |

A. Parameter File (PARMFILE)

Parameter files 110 describe the relationship between a data file and ERP system 100. Essentially, a parameter file describes, for interface 102, where to find data in the associated data file for each field of the screens of ERP system 100 and how to navigate through the screens of ERP system 100.

In one embodiment, the parameter file contains a list of parameters to be processed by interface 102. Parameter files can be created using any appropriate text editor. Each parameter is provided as one or more lines within the parameter file.

1. General Parameters

Table 2 provides one embodiment of a format for general parameters of parameter file 110. This embodiment is provided by way of illustration and not by way of limitation and relates to the SAP R/3 ERP system.

TABLE 2

| Field | Columns | Description | Example |
| --- | --- | --- | --- |
| 1 | 1–4 | SAP transaction code | MM01 |
| 2 | 5–12 | SAP screen ID | SAPLMGMM |
| 3 | 13–16 | SAP screen number | 0060 |
| 4 | 17–49 | SAP field name | RMMG1-MATNR |
| 5 | 50–54 | Input file record number | always 00001 for MULTIRCD=N |
| 6 | 55–59 | Starting column in input file | 00001 |
| 7 | 60–64 | Field length in input file | 00005 |
| 8 | 65–187 | (optional) Default field value | –X |

In this embodiment, each parameter is placed in a single line within parameter file 110.

It is understood that the parameters used in parameter files 110 can differ from the parameter format described above with respect to Table 2. For example, the order of the fields in the parameter can be changed. Further, the parameters can be based on additional information that is useful in generating commands to provide data to ERP system 100. An example of the implementation of this parameter format is provided below in Section II.

If the field length defined in field 7 of the parameter is zero, the value in the default area of field 8 of the parameter is used even if the parameter specifies a valid offset. This is advantageous for providing spaces to a field of the ERP system without providing a space filler field on the data file (INFILE).

If the record number defined in field 5 is zero, the value in the default area (field 8) is used by interface 102. If length (field 7) is greater than zero, that number of characters from the default area (field 8) is used. This is another way to place a defined number of spaces into a field on a screen of the ERP system.

If the value in field 5 does not correspond to a valid record number, then interface 102 ignores the parameter. Further, when the record number in field 5 is zero (00000), the record will always be processed. In this case, the default value in Field 8 will be used, and not data from the input file (INFILE).

2. Conditional Logic Parameters

Parameter file 102 may also include conditional logic so that parameters may be executed conditionally. In one embodiment, this conditional logic includes IF/ELSE/ENDIF and FOR/NEXT constructs although other conventional logic functions can be used. The IF construct can take one of at least two different forms. First, the IF construct can be formatted as follows:

?IF aaaaa,bbbbb,ccccc OP 'up to 132 characters of value to test against' Alternatively, the IF statements can be formatted as:

?IF aaaaa,bbbbb,ccccc OP ddddd,eeeee,fffff

In these cases, aaaaa and ddddd correspond to a record number for a record in the data file. Further, bbbbb and eeeee correspond to a starting column for a field in the data file. The elements ccccc and fffff correspond to the length of the field in the data file. The element "OP" defines the basis of the comparison for the conditional logic. Exemplary values for the OP element are provided in Table 3. It is understood that the OP element can also take on other values.

TABLE 3

| Value | Definition |
|-------|------------|
| EQ | Equal |
| NE | Not equal |
| GT | Greater than |
| GE | Greater than or equal to |
| LT | Less than |
| LE | Less than or equal to |

The end of an if statement is defined by an ?ENDIF element. The "?ELSE" conditional logic may be used in conjunction with the ?IF conditional logic to provide an alternative in the event that the condition of the ?IF statement is not met.

The ?IF statements can be nested.

When ?IF logic is encountered, if there is an error in the ?IF statement (such as referring to a record that does not exist), control passes to the statement beyond the corresponding "?ENDIF" statement and no intervening statements are executed.

3. Control Statements

Parameter file 110 can also provide control statements. Control statements typically start in column one of a parameter. In general, these control statements provide instruction to interface 102 to control the processing of data. For example, in one embodiment, control statements include "?EOT" and "?OFFSETMULTI." Each of these control statements are discussed in turn.

The control statement "?EOT" can be used to indicate the end of a transaction. This causes the CALL TRANSACTION function of ERP system 100 to be explicitly performed. The ?EOT control statement can be located at any point within parameter file 110. It allows a CALL TRANSACTION function to be performed before all of the parameters are processed for a particular data record in data file 108.

The control statement "?OFFSETMULTI" can be used to allow start columns to refer to the actual column in multi-record input files, instead of relative to the beginning of the data area of the multi-record input file. Multi-record input files are described in more detail below in Section I.B. At this point, it is sufficient to state that when multiple records are grouped together for a single transaction, the data in each record does not begin in the first column. However, field starting columns are generally defined for interface 102 as being relative to the beginning of where data values starts. Thus, when the data field starts in column 63, for example, the ?OFFSETMULTI statement can be used to allow the parameter to indicate that data starts in column 63 instead of column 1 of the data area.

4. Restart Option

Interface 102 can include an option (RESTARTING OPTIONS) to control restart of interface 102 for datafile 108. The values for this parameter can be "No restart," "Restart: run if prev run OK," and "Restart: NO RUN if prev run OK." It is understood that other restart options can also be used. Each of these three options are described in turn below.

The value "No restart" means that interface 102 is to always start with the first record in the input file whether or not a prior run processed some or all of the data in datafile 108 successfully.

The value "Restart: run if prev run OK" means that interface 102 is to start with the first record in the input file if the AUDFILE indicates that the prior run completed correctly. If however, the prior run ended abnormally, this option means that interface 102 is to start with the next record after the last correctly processed record.

Finally, the value "Restart: NO RUN if prev run OK" means that if a prior run completed normally, interface 102 is to do nothing. However, if the prior run aborted, interface 102 is to start with the next record.

5. Miscellaneous Options

Interface 102 may also include one or more of the miscellaneous options described in Table 4.

TABLE 4

| Parameter | Value(s) | Description |
|-----------|----------|-------------|
| MULTIRCD | Y/N | Indicates whether there are multiple records in the INFILE file for a single transaction execution |
| TRAN_CD | **** or transaction code | Indicates to interface 102 which transactions in a PARMFILE to execute; the value "****"indicates to execute all transactions in the PARMFILE |
| INP_MODE | A/E/N | A = Show all screens as executed E = Show only screens that have errors N = Show no screens |
| BDCONERR | Y/N | Indicates BDC screen commands appear in the error file for transactions that fail. |
| MESSAGE NUMBERS | — | Lists message numbers that interface 102 will skip when writing errors to the MAILFILE. If the message number is listed, the error appears on the ERRFILE, but will not appear in the MAILFILE. |
| E-MAIL ADDRESSES | Addresses | A list of E-mail addresses that are to receive a copy of the MAILFILE. |
| UNIX COMMAND FOR SENDING MAIL | — | Used if a non-standard UNIX executable is required for actually sending the MAILFILE. |

B. The Data Files

Data files 108 can take on many different forms. For example, data file 108 may comprise data from an existing system that is being replaced by ERP system 100. Alternatively, the data of data file 108 may be generated by a stand-alone system that creates data in an on-going manner, e.g., shipping software, that may be used by ERP system 100. The data in data files 108 is referred to generally as "legacy data."

Data file 108 (INFILE) can have two slightly different record layouts. The particular layout is indicated to interface 102 using the MULTIRCD option described above. When the value of the MULTIRCD option is "Y," multiple data records are necessary to complete a transaction for ERP system 100. The format of data file 108 in this case is provided, by way of example and not by way of limitation, in table 5 below.

TABLE 5

| Column | Description |
| --- | --- |
| 1–48 | Unique key identifying the record set |
| 49–53 | Record number within the record set |
| 54–62 | Accumulator field |
| 63–8063 | Data values |

When the value of the MULTIRCD parameter is "N," all of the columns in data file 108 (e.g., columns 1–8000) each contain data values.

When the value of the MULTIRCD parameter is "Y," the unique key distinguishes for interface 102 which records belong together in a record set. Further, the record number keeps the records in a record set in the correct order. The accumulator field provides a way to give a total for failed and successful transactions. A "record set" is all the records that, combined, provide the data needed to complete all the ERP transactions in the PARMFILE once (e.g., to be able to create 1 Material Master). When the value of the MULTIRCD parameter is "N," there is only one record needed to complete all the SAP transactions in the PARMFILE once.

C. Other Files

The following additional files may be used by interface 102 in processing data for ERP system 100.

1. RCDDESC:

The RCDDESC file is used to define where the key field [KEYFLD], accumulator field(s) [ACCUM], and field data values [FLDVLUS] appear on the input file. The layout of one embodiment of a RCDDESC file is provided in Table 6.

TABLE 6

| Columns | Description |
| --- | --- |
| 1–8 | Keyword (KEYFLD, ACCUM, FLDVLUS) |
| 10–14 | Input file record number |
| 16–20 | Starting column in input file (e.g. 00001) |
| 22–26 | Field length in input file (e.g. 00005) |
| 28–47 | (optional) User-defined accumulator field name |

2. MAILLIST

The MAILIST file contains e-mail addresses that are used to report errors. Each line of the file is a single E-mail address. Each address will receive a copy of the MAILFILE formatted errors file.

3. AUDFILE

The AUDFILE stores information while interface 102 processes data in input file 108. In one embodiment, interface 102 looks for a completed AUDFILE before beginning processing. This prevents accidental re-running of already processed data. To process further data, the AUDFILE is removed from the system.

D. The Interface Process

Figure 2:
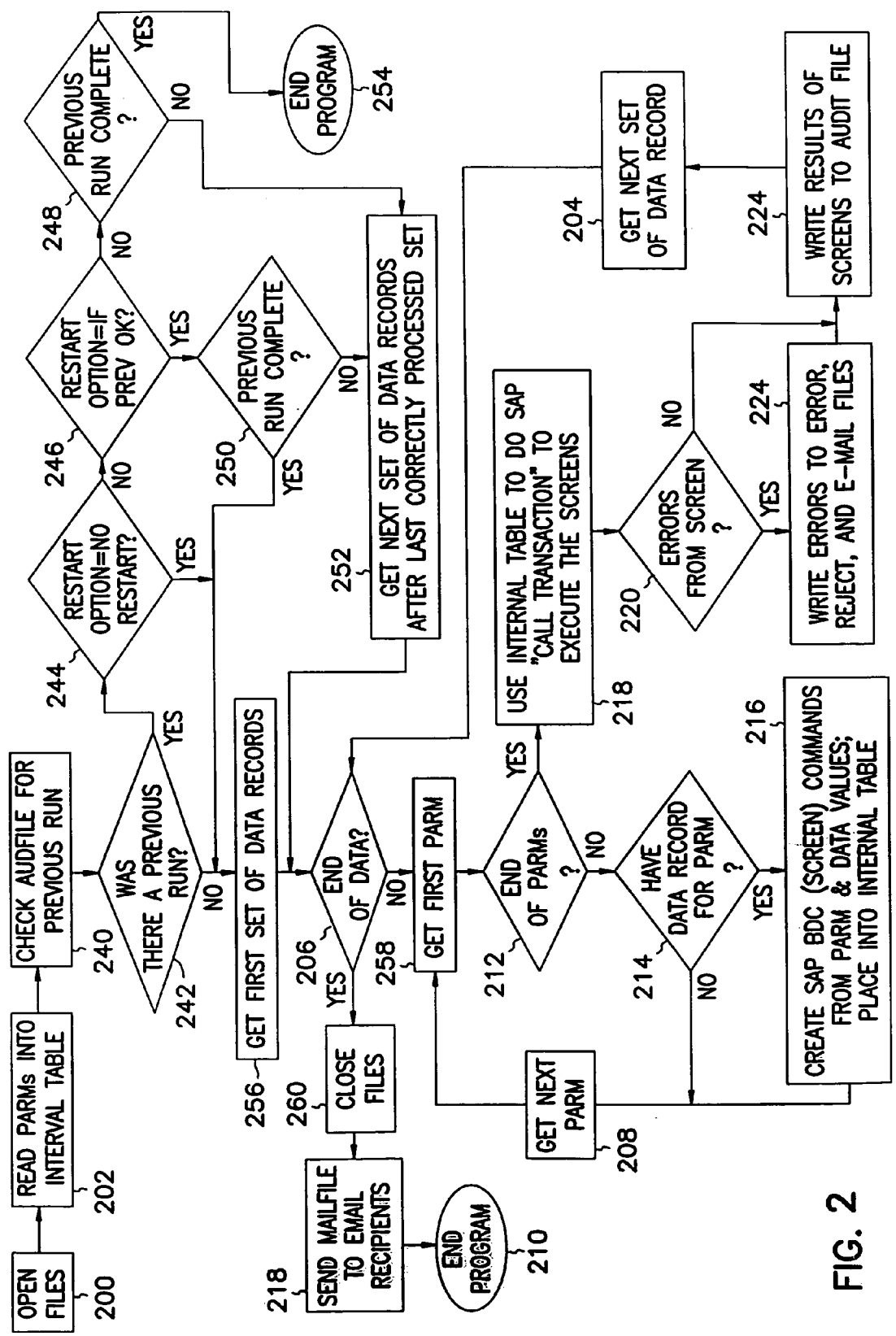
FIG. 2 is a flow chart that illustrates one embodiment of a process for an interface for an enterprise resource planning program according to the teachings of the present invention.

FIG. 2 is a flow chart that illustrates one embodiment of a process for an interface for an enterprise resource planning program according to the teachings of the present invention. The method begins at block 200 and opens the files associated with the data to be processed by interface 102. For example, the method opens parameter file 110 (PARMFILE), data file 108 (INFILE), and any other files associated with the data to be processed. At block 202, the method reads the parameters into an internal table from the PARMFILE.

At block 240, the method retrieves information from the AUDFILE as to whether a previous run existed, and if so, if the previous run was successfully completed. At block 242, the method determines whether there was a previous rung. If there was a previous run, the method proceeds to block 244. If there were no previous run, the method proceeds to block 256.

At block 244, the method determines whether the Restart option was "No Restart." If so, the method proceeds to block 256. If the Restart option was not "No Restart," the method proceeds to block 246.

At block 246, the method determines whether the Restart option was "Run if Prev OK." If so, the method proceeds to block 250. If the Restart option was not "Run if Prev OK," the method proceeds to block 248.

At block 248, the Restart option is assumed to be "NO RUN if prev run OK" since the other two options failed. Here, the method determines whether the previous run completed successfully. If the previous run completed successfully, the method proceeds to block 254 and interface 102 ends processing. If the previous run did not complete successfully, the method proceeds to block 252.

At block 250, the method determines whether the previous run completed successfully. If so, the method proceeds to block 256. If the previous run did not complete successfully, the method proceeds to block 252 where it retrieves data from the INFILE until it obtains the set following the last correctly processed set of data. The method then proceeds to block 206.

At block 256, the method retrieves the first set of data records from the INFILE and proceeds to block 206.

At block 206, the method determines whether the end of the data in the INFILE has been reached. If so, the method proceeds to block 260, where all associated input and output files are closed, and then to block 262, where the MAILFILE is sent via e-mail to all specified recipients. Interface 102 then ends processing at block 210.

If the end of the data in the INFILE has not been reached at block 206, then the method proceeds to block 258 and retrieves the first parameter in the PARMFILE. At block 212, the method determines whether the end of the parameters has been reached for this data record. If the end of the parameters in the PARMFILE has not been reached, the method proceeds to block 214. At block 214, the method determines whether there is data associated with the parameter. If not, the method proceeds to block 208 and retrieves the next parameter and then returns to block 212. If, at block 214, the method determines that there is data associated with the parameter, then the method proceeds to block 216.

At block 216, the method creates an SAP BDC command from the parameter and data values. This command is placed in an internal table. The method proceeds to block 208 and retrieves the next parameter.

If, at block 212, the method determines that the last parameter from the PARMFILE has been processed, the method proceeds to block 218. At block 218, the method uses the internal table to do an SAP "CALL TRANSACTION" to execute screens based on the processed parameters of the PARMFILE. The method proceeds to block 220.

At block 220, the method determines whether there are errors in processing the screens for the CALL TRANSACTION. If there are errors, the errors are written to ERRFILE, REJFILE, and MAILFILE as defined above. These files are used to track errors in the process executed by interface 102. The method proceeds to block 224.

If there are no errors, then the method proceeds from block 220 to block 224 and writes the results to an audit file (e.g., AUDFILE). The method then returns to block 204 and retrieves the next set of data records. When all data records have been processed, the method closes files at block 260, sends e-mail at block 262, and ends at block 220.

II. EXAMPLE

FIGS. 3A through 3E are screen shots that illustrate an example of the process of FIGS. 1 and 2 for providing data to an ERP system. This example also includes the PARMFILE and INFILES listed below. This example relates to updating a profit center on a material master.

A. The PARMFILE

The PARMFILE for this example is as follows:

```
?IF 00001, 00001, 00004 EQ '0000'
** do nothing . . . . invalid plant ID
?ELSE
?IF 00001, 00005, 00018 EQ ' '
** do nothing . . . . material number is missing
?ELSE
?IF 00001, 00047, 00010 EQ ' '
**do nothing . . . . profit center is missing
?ELSE
*enter part number, and press SELECT
VIEW(S)
MM02 SAPLMGMM 0060 RMMG1-MATNR    001 00005 00018
MM02 SAPLMGMM 0060 BDC_OKCODE     001 00000 00000 /5
*
* Select Basic Data view from pop-up and
press ENTER
MM02 SAPLMGMM 0070 MSICHTAUSW-    001 00000 00000 X
KZSEL(1)
MM02 SAPLMGMM 0070 BDC_OKCODE     001 00000 00000 /00
*
*From the Basic Data Screen, select the
menu option to go to the Storage screen
MM02 SAPLMGMM 3004 BDC_OKCODE     001 00000 00000 SP13
*
* On pop-up, enter the plant number and
press ENTER to continue to Storage screen
MM02 SAPLMGMM 0081 RMMG1-WERKS    001 00001 00004
MM02 SAPLMGMM 0081 BDC_OKCODE     001 00000 00000 /00
*
*Update the profit center on the Storage screen,
and press SAVE button
MM02 SAPLMGMM 3000 MARC-PRCTR
MM02 SAPLMGMM 3000 BDC_OKCODE     001 00000 00000 /11
*
?ENDIF
?ENDIF
?ENDIF
```

This PARMFILE uses three conditional parameters. First, the PARMFILE looks for a plant ID in the first four columns of the data file. The value "0000" is defined as an invalid plant ID. The second conditional parameter looks for a material number in the 18 columns following the plant ID. The conditional parameter fails if the material number is missing (e.g., spaces only, no data). The final conditional parameter determines whether the profit center is found in the ten spaces beginning in column 47. If a data record does not fail any one of these conditional parameters, then interface 102 proceeds to gather information to perform a CALL TRANSACTION using the data in the selected data record of the INFILE. The layout of the INFILE is described below.

B. The INFILE

The INFILE for this example includes three main fields. These fields include: a plant ID, a material number and a profit center. The INFILE for this example contains four records. The first three each fail to meet one of the conditional parameters. The final entry is valid and FIGS. 3A through 3F illustrate the manner in which the data is applied to ERP system 100 using the PARMFILE. The INFILE includes the following four lines of data records:

| |
|---|
| 0000 |
| 0081 |
| 00811000197 |
| 00811000197              ADM |

This data is extracted from a legacy system using either an off-the-shelf extraction program or a custom designed extraction program.

C. The Operation of Interface 102

The first record contains the value "0000." This is defined as an invalid plant ID. Thus, the first ?IF statement is not satisfied and interface 102 skips the remaining parameters within the associated ?ENDIF statement.

The second record contains a valid plant ID. The value is 0081. However, the record fails the second conditional parameter because the material number is missing. Again, interface 102 skips the remaining parameters within the associated ?ENDIF statement.

The third record contains a valid plant ID (0081) and a valid material number (1000197), but fails to meet the third conditional parameter. Interface 102 thus skips all of the remaining parameters within the associated ?ENDIF statement.

Figure 3A:
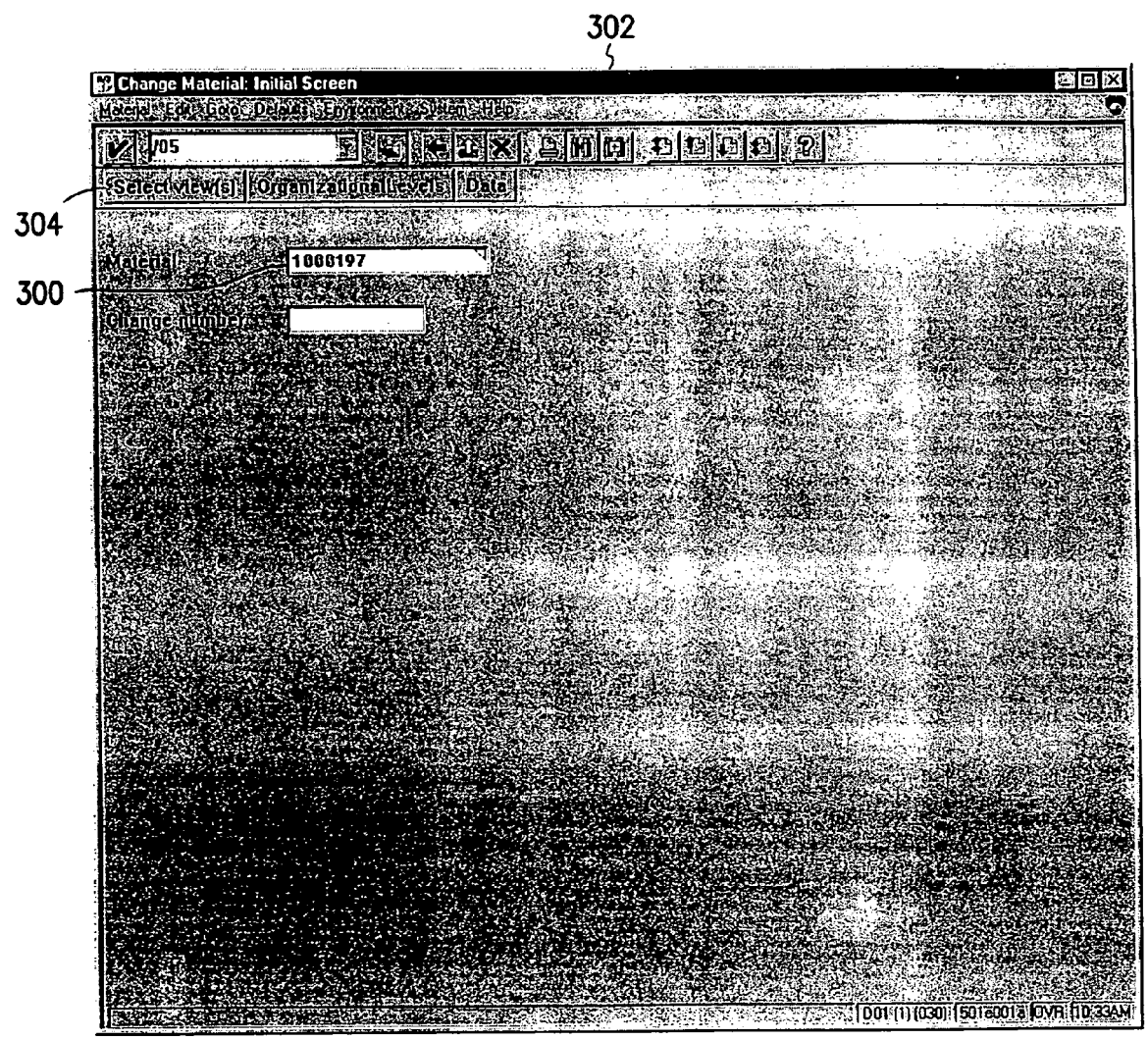
FIGS. 3A through 3E are screen shots that illustrate one embodiment of a process for an interface for an enterprise resource planning program according to the teachings of the present invention.
Figure 3B:
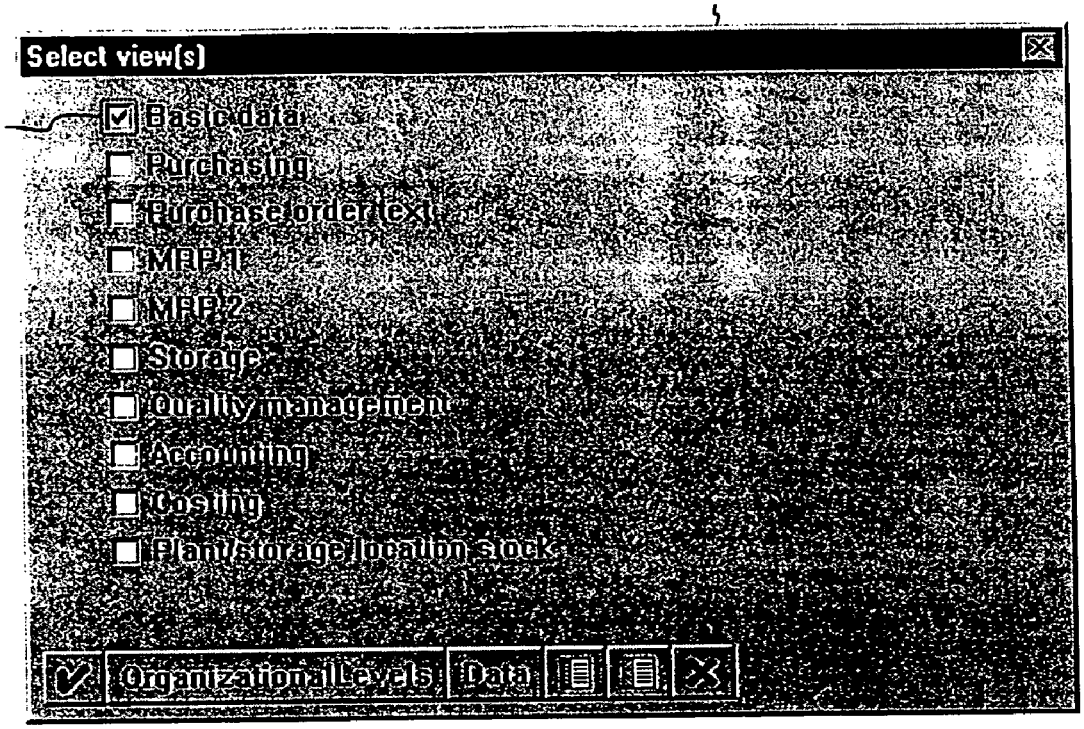

Finally, the fourth record passes the three conditional parameters and thus moves on to allow interface 102 to process the data in the fourth row of the INFILE. As shown in FIG. 3A, the parameter:

MM02 SAPLMGMM 0060 RMMG1-MATNR 00100005 00018 places part number, 1000197, into the material field 300 of screen 302. The next parameter

MM02 SAPLMGMM 0060 BDC_OKCODE 001 00000 00000 /5 selects Select View(s) button 304 of screen 302. This brings up Select View(s) screen 306 of FIG. 3B. The parameter

MM02 SAPLMGMM 0070 MSICHTAUSW-KZSEL(1) 001 00000 00000 X instructs interface 102 to select the Basic data option in the Select View(s) screen 306 as indicated by check box 308. The parameter

Figure 3C:
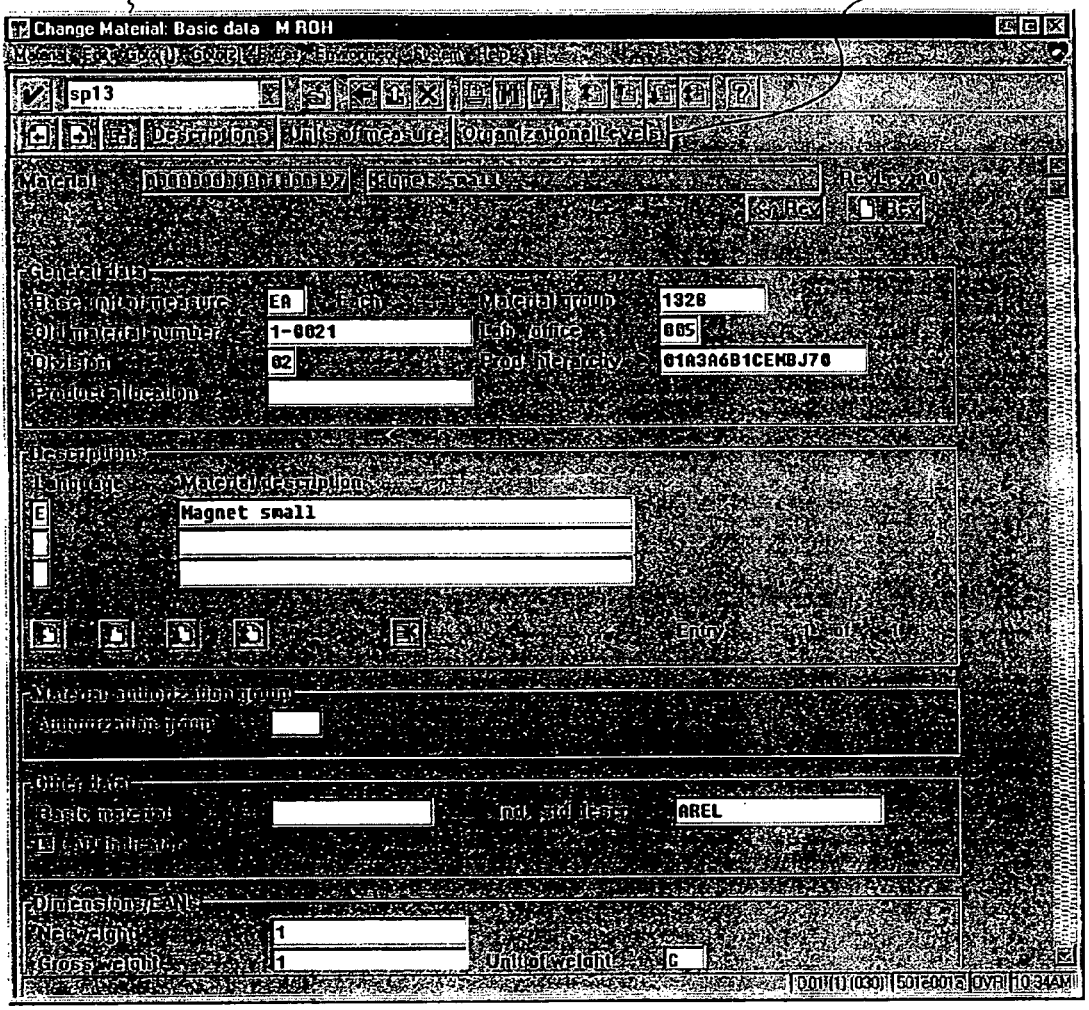

MM02 SAPLMGMM 0070 BDC_OKCODE 001 00000 00000 /00 selects the ENTER key. Next, Basic Data screen 310 of FIG. 3C is displayed. The parameter

Figure 3D:
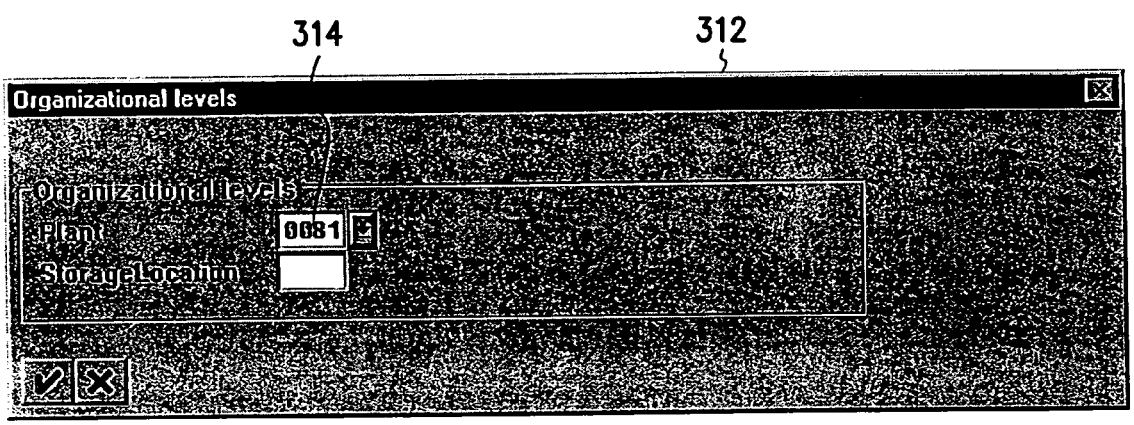

MM02 SAPLMGMM 3004 BDC_OKCODE 001 00000 00000 SP13 selects organization levels button 311 to proceed to the organization levels screen 312 of FIG. 3D. When screen 312 pops-up, the parameter

MM02 SAPLMGMM 0081 RMMG1-WERKS 001 00001 00004 causes the plant ID to be applied to field 314 of screen 312. The parameter

Figure 3E:
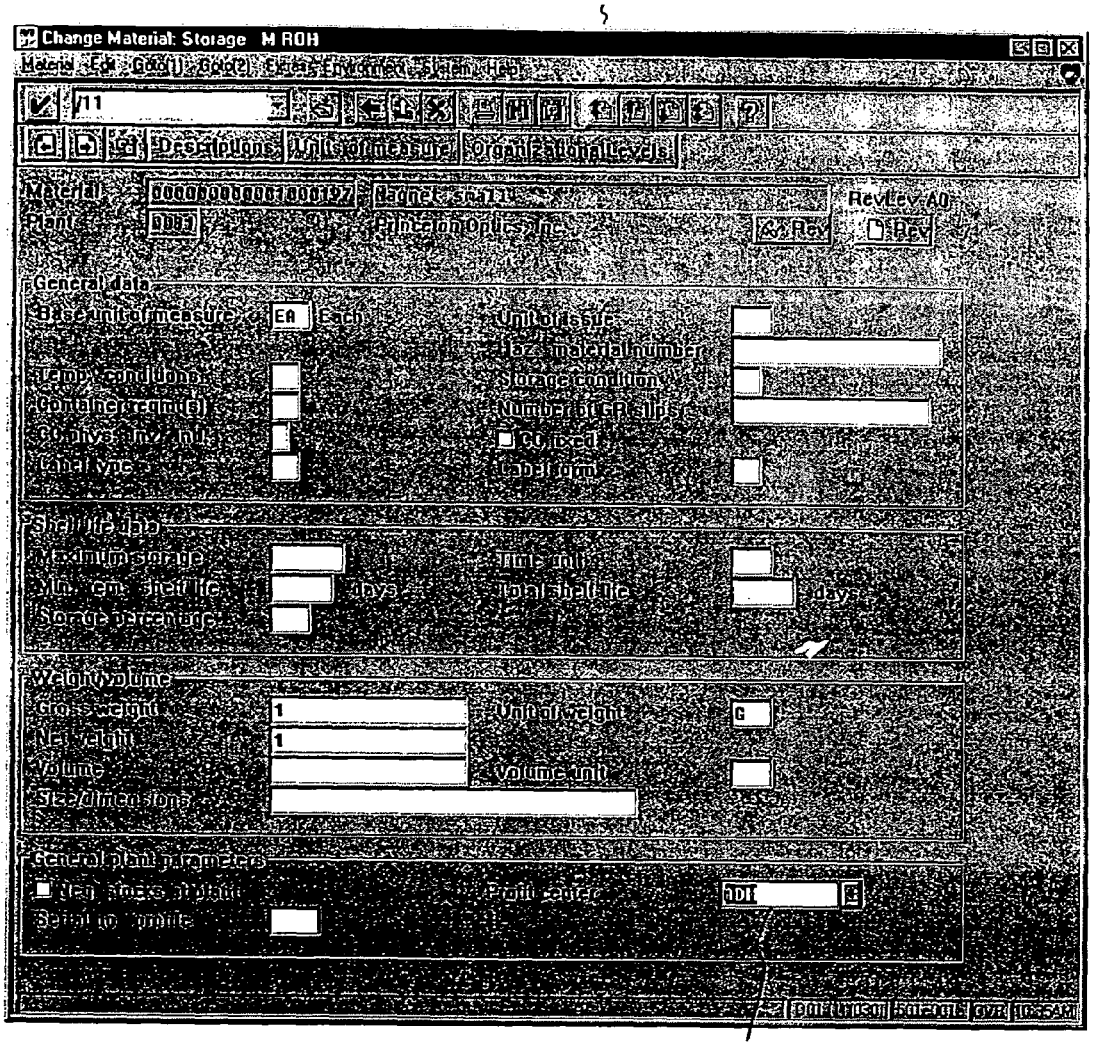

MM02 SAPLMGMM 0081 BDC_OKCODE 001 00000 00000 /00 causes the ENTER key to be pressed to bring up storage screen 316 of FIG. 3E. The parameter

MM02 SAPLMGMM 3000 MARC-PRCTR 001 00047 00010 updates profit center field 318 on the Storage screen 316 with the value "ADM." The parameter

MM02 SAPLMGMM 3000 BDC_OKCODE 001 00000 00000 /11 presses SAVE button.

III. COMPUTER SYSTEM

Figure 4:
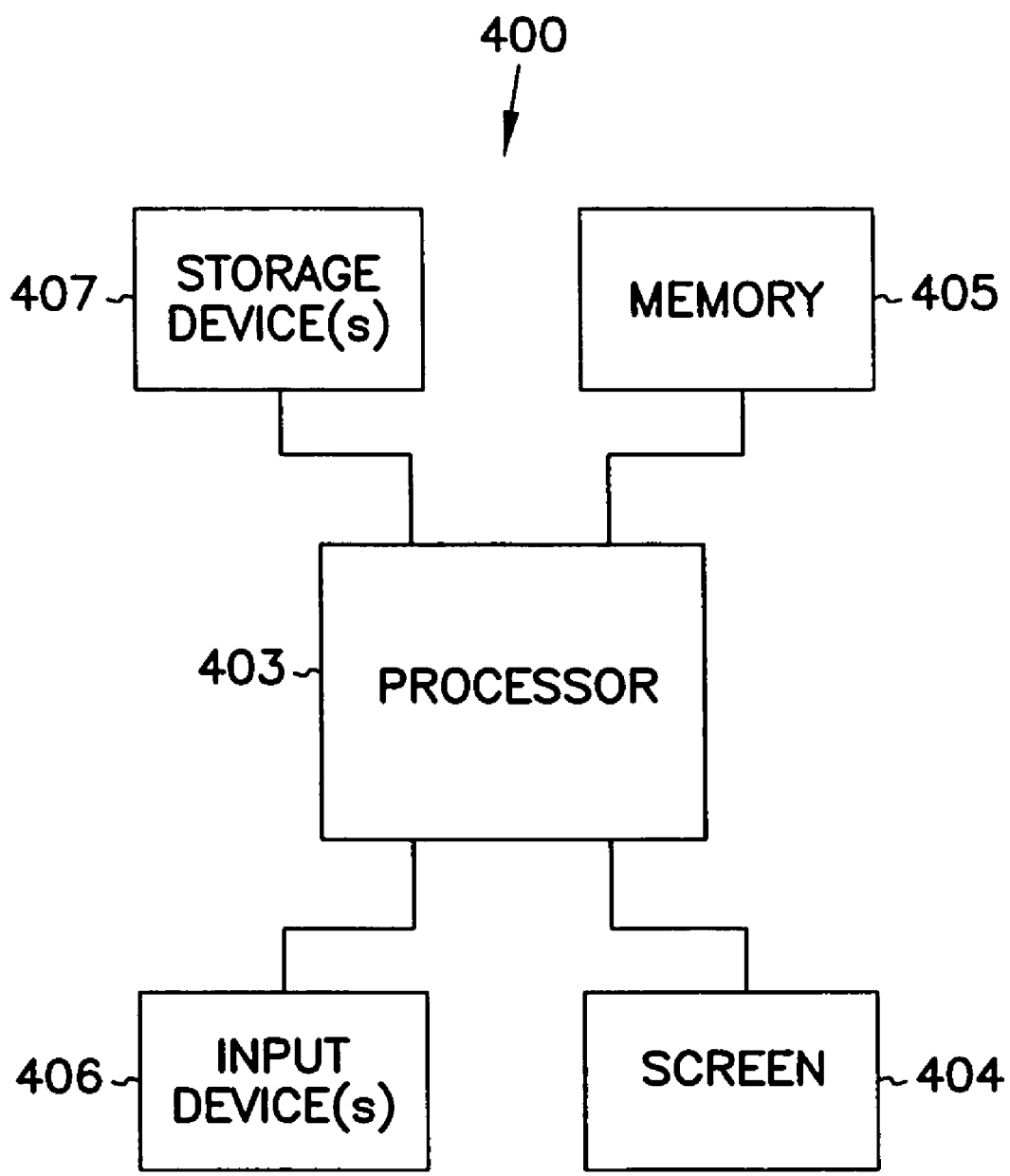
FIG. 4 is a block diagram of an embodiment of a computer system having an interface for an enterprise resource planning program according to the teachings of the present invention.

FIG. 4 is a block diagram of an embodiment of a computer system, indicated generally at 400, having an interface for an enterprise resource planning program according to the teachings of the present invention. For example, computer system 400 may implement embodiments of the processes described above with respect to FIGS. 1 and 2.

System 400 is a microprocessor based computer. Computer 400 includes processor 403 such as a Power PC 604, 604E, or 564 from IBM Corporation. Processor 403 is coupled to memory 405, and data storage device(s) 407 (e.g., hard disk drive, floppy disk drive, CD ROM or other appropriate computer readable medium). The computer uses an operating system such as AIX 4.2.1 from IBM Corporation or other appropriate operating system. Processor 403 is further coupled to screen 404, and input devices 406.

Input device(s) 406 includes, for example, a key pad, keyboard, mouse, touch screen, serial port or other device for providing inputs to processor 403. Storage device(s) 407 stores program code for executing instructions to implement one or more of the methods described above to provide data to an ERP system from a legacy data source. For example, storage device(s) 407 store at least one parameter file and at least one data file and program code for interface 102 that are used to provide the data to an ERP system.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the embodiments are described in terms of an interface for an ERP system from SAP. It is understood that the interface described herein is not limited to use with the SAP system. Parameter files and data files can be used with interface 102 to interface with other ERP systems. Further, other conditional logic parameters can be used in conjunction with or in place of the conditional logic parameters described herein. It is further noted that although computer system 400 is described in terms of a PowerPC® from IBM, it is understood that a computer using another type of processor, such as a processor from Intel™ Corporation, and the Microsoft™ Windows® NT operation system available from Microsoft™ Corporation can also be used.

What is claimed is:

1. A method for interfacing with an enterprise resource planning system, the method comprising:
    providing a file containing data to be loaded into the enterprise planning system (the "data file");
    creating a file containing at least one parameter (the "parameter file"), wherein the parameter file maps data from the data file to screens of the enterprise resource planning system; and
    processing each record in the data file according to the parameters in the parameter file to execute screens of the enterprise resource planning system so as to provide the data from the data file to the enterprise resource planning system.

2. The method of claim 1, wherein providing the file containing data comprises extracting the data from an legacy system.

3. The method of claim 1, wherein creating a file containing at least one parameter includes creating a file that also includes conditional logic associated with the parameters.

4. The method of claim 1, wherein creating a file containing at least one parameter comprises creating a file with a text editor.

5. The method of claim 1, wherein creating a file containing at least one parameter comprises creating a file with at least one parameter that includes a transaction code, a screen identification code, a screen number, and a field name associated with the enterprise resource planning system and a field location value and a field length associated with the data file.

6. The method of claim 1, wherein processing each record in the data file comprises:
    retrieving a record from the data file;
    retrieving parameters from the parameter file;
    creating commands for the enterprise resource planning system based on the parameters and the data in the retrieved record; and
    executing screens of the enterprise resource planning system based on the created commands.

7. The method of claim 6, wherein retrieving parameters includes retrieving conditional logic parameters.

8. The method of claim 1, and further recording errors when executing screens of the enterprise resource planning system.

9. The method of claim 1, and further recording in an audit file a result for each record of the data file.

10. The method of claim 1, and further comprising transmitting results of a run of the method to at least one e-mail address.

11. The method of claim 1, and further selectively ceasing processing the records in the data file.

12. The method of claim 1, and further comprising restarting the processing of records in the data file at a point in the data file corresponding to a last record processed during a prior execution of the method with the data file.

13. A method for providing data to an Enterprise Resource Planning system, the method comprising:
   opening a parameter file containing a plurality of parameters;
   opening an associated data file containing a plurality of records;
   wherein the parameter file maps data from the data file to screens of the Enterprise Resource Planning system;
   for each record in the data file, creating commands based on the plurality of parameters; and
   executing the commands to provide the data from the data file to the Enterprise Resource Planning system.

14. The method of claim 13, wherein opening a parameter file comprises opening a parameter file that includes conditional parameters.

15. The method of claim 13, wherein opening a parameter file comprises opening a parameter file that includes a restart option.

16. The method of claim 13, and further recording in an audit file a result for each record of the data file.

17. The method of claim 13, and further comprising transmitting processing results to at least one e-mail address.

18. The method of claim 13, wherein creating commands based on the plurality of parameters comprises creating commands based on the plurality of parameters and at least two associated records.

19. The method of claim 13, wherein opening a parameter file comprises opening a parameter file that includes parameters that each have a transaction code, a screen identification code, a screen number, and a field name associated with the enterprise resource planning system and a field location value and a field length associated with the data file.

20. A computer-readable medium encoded with a computer program for execution by a processor to perform a method comprising:
   opening a parameter file containing a plurality of parameters;
   opening an associated data file containing a plurality of records;
   for each record in the data file, creating commands based on the plurality of parameters; and
   executing the commands to provide the data from the data file to an Enterprise Resource Planning system.

21. The computer readable medium of claim 20, wherein opening a parameter file comprises opening a parameter file that includes conditional parameters.

22. The computer readable medium of claim 20, wherein opening a parameter file comprises opening a parameter file that includes a restart option.

23. The computer readable medium of claim 20, and further recording in an audit file a result for each record of the data file.

24. The computer readable medium of claim 20, and further comprising transmitting processing results to at least one e-mail address.

25. The computer readable medium of claim 20, wherein creating commands based on the plurality of parameters comprises creating commands based on the plurality of parameters and at least two associated records.

26. The computer readable medium of claim 20, wherein opening a parameter file comprises opening a parameter file that includes parameters that each have a transaction code, a screen identification code, a screen number, and a field name associated with the enterprise resource planning system and a field location value and a field length associated with the data file.

* * * * *